G. CORSON.
PORTABLE HOLDER.
APPLICATION FILED MAY 27, 1915. RENEWED JUNE 15, 1918.
1,287,892.
Patented Dec. 17, 1918.
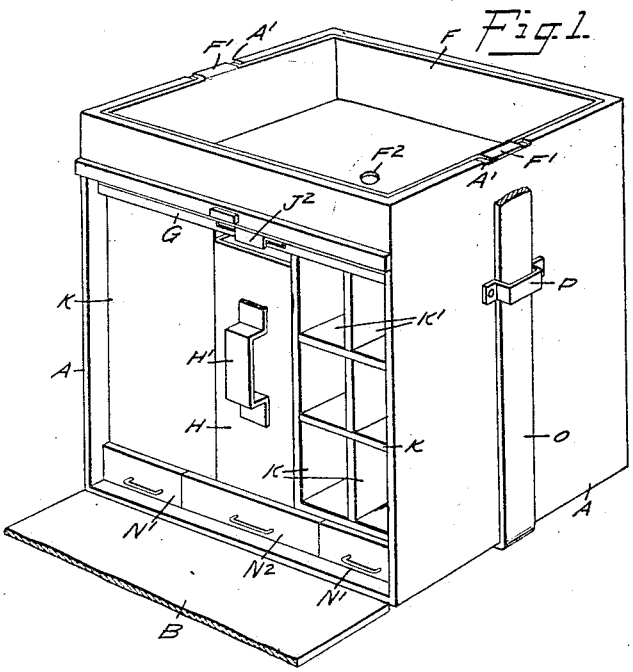
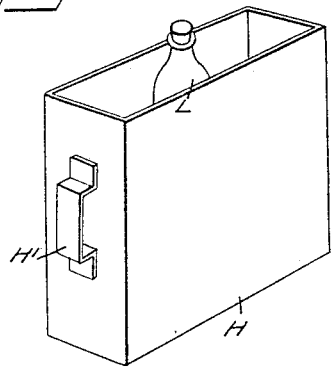
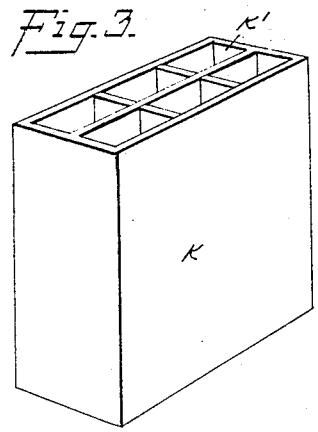
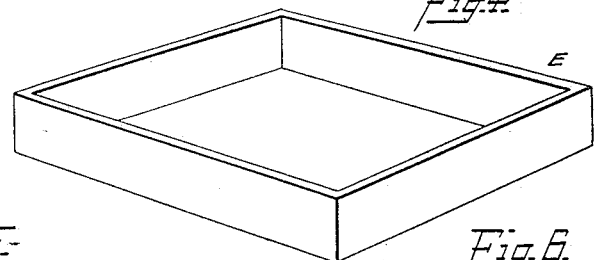
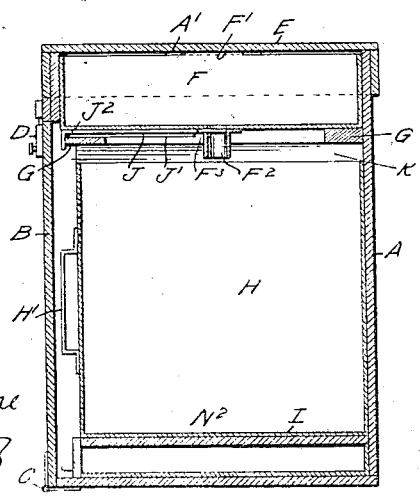
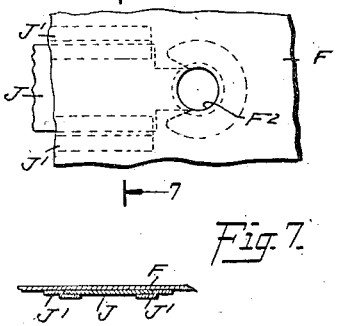
WITNESSES
George L. Blume
INVENTOR
Georgina Corson.
BY
ATTORNEYS

UNITED STATES PATENT OFFICE.

GEORGINA CORSON, OF NEW YORK, N. Y.

PORTABLE HOLDER.

1,287,892.  Specification of Letters Patent.  Patented Dec. 17, 1918.

Application filed May 27, 1915, Serial No. 30,816. Renewed June 15, 1918. Serial No. 240,255.

*To all whom it may concern:*

Be it known that I, GEORGINA CORSON, a subject of the King of Great Britain, and a resident of the city of New York, borough of Manhattan, in the county and State of New York, have invented a new and Improved Portable Holder, of which the following is a full, clear, and exact description.

The object of the invention is to provide a new and improved portable holder more especially designed for use in the home, hospital or when traveling, and arranged to permit of carrying a number of bottles filled with milk or other liquids together with nipples and other accessories for the needs of a baby, invalid or other person during the journey, to keep the milk or other liquid in proper condition by refrigeration and to allow of conveniently heating a bottle filled with the milk or other liquid immediately prior to feeding the contents of the bottle to the person.

In order to accomplish the desired result use is made of a casing, a front door and a removable top for use as a tray, an ice holder in the top of the casing and having an outlet for the ice water, drawers in the bottom of the casing, a removable tank in the casing and into which discharges the said outlet, and bottle holders removably held in the casing and each having a plurality of cells each adapted to contain a bottle filled or empty, and a manually controlled valve for the said outlet to close the latter on removing the tank from the casing for use over a stove or over a lamp for heating the water therein and for heating the contents of a bottle set into the tank.

A practical embodiment of the invention is represented in the accompanying drawings forming a part of this specification, in which similar characters of reference indicate corresponding parts in all the views.

Figure 1 is a perspective view of the holder with the cover removed and the door open;

Fig. 2 is a perspective view of the tank with a bottle therein for heating the contents thereof;

Fig. 3 is a perspective view of one of the bottle holders;

Fig. 4 is a perspective view of the removable cover to be used as a tray;

Fig. 5 is a cross section of the holder;

Fig. 6 is a plan view of the central portion of the ice box and the valve for closing the outlet of the ice box; and Fig. 7 is a sectional side elevation of the same on the line 7—7 of Fig. 6.

The casing A is provided at the front with a door B connected by hinges C with the bottom of the casing to allow of conveniently moving the door into an open or closed position, as shown in Figs. 1 and 5. The upper end of the door B is adapted to be locked in closed position by a suitable locking device D. Onto the top of the casing A fits a removable cover E which when lifted off the casing and turned upside down, as shown in Fig. 4, serves as a tray for holding a drinking glass, bottle, nipples, spoons or other articles.

Within the upper portion of the casing A is arranged an ice holder F in the form of a shallow box open at the top and resting on a supporting frame G attached to the inside of the casing A, as plainly shown in Fig. 5. The ice holder F is provided at the upper edges of the sides with handles F' to permit of conveniently lifting the ice holder out of the casing for cleaning or other purposes. The handles F' extend into cutout portions A' in the upper edges of the sides of the casing A so as not to interfere with the cover E when the latter is in position on the casing. The cover E is temporarily removed whenever it is desired to fill the ice holder with ice.

The bottom of the ice holder F is provided at its middle with a short depending outlet spout $F^2$ for discharging the ice water, incident to the melting of the ice in the holder F, into a tank H removably set in the casing A and resting on a false bottom I arranged in the lower portion of the casing. The outlet spout $F^2$ is provided at the front with a slot $F^3$ for the passage of a slide valve J employed for closing the spout $F^2$ whenever it is desired to remove the tank H from the casing so that the interior of the casing is not flooded or soiled with ice water during the time the tank H is removed from the casing A.

The valve J is mounted to slide in suitable guideways J' held on the under side of the bottom of the ice holder F and the forward end of the valve J terminates in a handle $J^2$ adapted to be taken hold of by the user for moving the valve into open or closed position relative to the spout $F^2$. The front of the tank H is provided with a suitable handle H' to permit of conveniently pushing the tank H in position in the casing A or drawing it out from the same. By reference to Fig. 5, it will be noticed that the lower end of the spout F² is above the top of the tank H to allow of conveniently pushing the tank H into position in the casing A or removing it therefrom.

Into the casing A fit removable bottle holders K, each having a number of cells K', preferably six, and each of a size to accommodate a bottle L adapted to contain milk or other liquid.

The bottle holders K rest on the false bottom I and fit into the space between the sides of the tank H and the sides of the casing A, and the bottle holders, tank and casing are so proportioned that the bottle holders can be inserted into the casing with the cells K in vertical or horizontal position, and when in either position the corresponding space in the casing is snugly filled to prevent rattling when carrying the holder about. As shown in Fig. 1, the holder K to the left of the tank H is in vertical position while the holder K to the right of the tank is disposed horizontally so that any one bottle in the cells K' can be removed without removing this holder K from the casing.

Into the space between the real bottom of the casing A and the false bottom I are fitted side drawers N, N' and a middle drawer N², of which one of the side drawers is used for the storage of unused nipples and the other for used nipples, while the middle drawer N² is used for the storage of various utensils such as spoons, dippers, small towels, rubber bands and the like.

In order to permit of carrying the portable holder about, use is made of a carrying strap O passed around the bottom and sides of the casing and over the cover E, the strap passing through suitable guides P on the sides of the casing A.

By the use of the device a large number of bottles of milk, say twelve, can be readily accommodated in the cells K' of the holders K, and these bottles of milk are kept cool by the ice in the ice holder F, it being understood that when the device is in use the holder F is filled with ice, the cover E is in position on the top of the casing and the door B is normally closed. When it is desired to use a bottle of milk the door B is opened and a bottle of milk is removed from a cell K' and an unused nipple can be taken out of the corresponding drawer for feeding the milk to a baby.

In case it is desired to feed the milk warm to the baby, the valve J is closed and the tank H containing ice water is removed from the casing A and the bottle of milk is placed in the tank (see Fig. 2); then the tank is placed on a stove or held over a burning lamp to heat the water in the tank and hence the bottle and its contents. The bottle after being emptied of its contents can be returned to its cell if desired. The tank H after use, as above described, or after being emptied of the water, is returned to the casing A, and then the valve J is again opened to allow the water in the ice holder F to flow into the tank H by way of the spout F².

From the foregoing it will be noticed that a very compact device is provided which can readily accommodate a large number of bottles of milk kept at the desired temperature by the use of the ice in the holder F.

Having thus described my invention, I claim as new and desire to secure by Letters Patent:

1. A holder of the class described, comprising a casing having a front door and a removable flanged top adapted when removed to form a tray, an ice holder in the top of the casing and provided with a valved outlet for the escape of the ice water, said outlet opening into the interior of the casing, a water tank removably set in the casing and into which discharges the said outlet, and a receptacle removably fitting into the said casing on each side of the said tank, the tank and receptacles filling the space between the side walls of the casing.

2. A holder of the class described, comprising a casing having a front door, an ice holder mounted in the top of the said casing and having an outlet for the ice water, said outlet opening into the interior of the casing, a water tank removably set in the said casing and into which discharges the said outlet, and bottle holders removably fitting into the said casing on opposite sides of the said water tank, the combined width of the tank and bottle holders being slightly less than the width of the casing so that the said tank and holders completely fill the space between the side walls of the casing.

3. A holder of the class described, comprising a casing having a front door, an ice holder mounted on the top of the said casing and having an outlet for the ice water, a water tank removably set in the said casing and into which discharges the said outlet, and bottle holders removably fitting into the said casing on opposite sides of the said water tank, each bottle holder having a plurality of cells each for containing a single bottle, the said casing, tank and bottle holders being arranged to allow of placing a bottle holder into the casing with the cells in upright or horizontal position, the tank and holders filling the space between the side walls of the casing when the holders are in either of the said positions.

4. In a holder of the class described, a casing having a front door, an ice holder in the top of the casing and having at the middle of its bottom a valved outlet, and three receptacles removably mounted in the casing and filling the space between the side walls of the casing, the central receptacle serving as a water tank to receive the ice water from the holder.

5. A holder of the class described, comprising a casing having a front door and a removable flanged cover, an ice holder mounted in the top of the said casing, and having an outlet for the ice water, a water tank removably set in the said casing and into which discharges the said outlet, bottle holders removably fitting into the said casing on opposite sides of the said water tank, the tanks and bottle holders filling the space between the side walls of the casing, a false bottom in the said casing and on which rest the said tank and the said bottle holders, and drawers in the bottom portion of the casing below the said false bottom.

In testimony whereof I have signed my name to this specification in the presence of two subscribing witnesses.

GEORGINA CORSON.

Witnesses:
JENNIE H. EADIE,
JOSEPH F. MITCHELL.

Copies of this patent may be obtained for five cents each, by addressing the "Commissioner of Patents, Washington, D. C."